ary Examiner—Lewis Gotts
United States Patent [19]
Sakakibara et al.

[11] 3,856,769
[45] Dec. 24, 1974

[54] METHOD FOR PREPARING BIOLOGICALLY ACTIVE (PYRO) GLUTAMYL-HISTIDYL-TRYPTOPHYL-SERYL-TYROSYL-GLYCYL-LEUCYL-ARGINYL-PROLYL-GLYCINE AMIDE

[76] Inventors: Shunpei Sakakibara, No. 23-3, Fujishirodai 2-chome, Suita-shi, Osaka; Yuichi Kumahara, No. 22-10, Takarayama-machi, Toyonaka-shi, Osaka; Terutoshi Kimura, No. 14-3-102, Ohara-machi, Ashiya-shi, Hyogo, all of Japan

[22] Filed: Sept. 5, 1972

[21] Appl. No.: 286,394

[30] Foreign Application Priority Data
Sept. 2, 1971 Japan............................ 46-67745

[52] U.S. Cl............................ 260/112.5, 424/177
[51] Int. Cl... C07c 103/52, C07g 7/00, A61k 27/00
[58] Field of Search............................... 260/112.5

[56] References Cited
UNITED STATES PATENTS

| | | | |
|---|---|---|---|
| 3,780,014 | 12/1973 | Flouret | 260/112.5 |
| 3,784,535 | 1/1974 | Flouret | 260/112.5 |
| 3,787,386 | 1/1974 | Flouret et al. | 260/112.5 |
| 3,790,554 | 2/1974 | Flouret | 260/112.5 |
| 3,803,117 | 4/1974 | Flouret | 260/112.5 |

OTHER PUBLICATIONS
Chang et al., J. Med. Chem., 15, 623–627 (1972).
Matsuo et al., Biochem. Biophys. Res. Comm., 45, 822–827 (1971).
Sievertsson et al., Biochem. Biophys. Res. Comm., 44, 1566–1571 (1971).
Monahan et al., C. R. Acad. Sc. Paris, 273 D, 508 (1971),
Baba et al., Biochem. Biophys. Res. Comm., 44, 459 (1971), July pub. date.
Matsuo et al., Biochem. Biophys. Res. Comm., 43, 1334 (1971), June pub. date.

Primary Examiner—Lewis Gotts
Assistant Examiner—Reginald J. Suyat
Attorney, Agent, or Firm—Sughrue, Rothwell, Mion, Zinn & Macpeak

[57] ABSTRACT

A method for preparing (pyro)glutamyl-histidyl-tryptophylseryl-tyrosyl-glycyl-leucyl-arginyl-prolyl-glycine amide which comprises reacting an oligopeptide fragment identified as (I) with an oligopeptide fragment identified as (II), each of which are prepared according to the synthesis described below, to form the heptapeptide, seryl-tyroxyl-glycyl-leucyl-arginyl-prolyl-glycine amide having some corresponding protective groups thereon, and coupling the resulting heptapeptide with protected tryptophane, histidine and (pyro)glutamic acid in turn at the nitrogen terminal of the each resulting peptide by stepwise elongation to result in a protected decapeptide, and then removing all the protective groups by treating the protected decapeptide with hydrogen fluoride:

Fragment (I)

Leucyl-(N-protected)arginyl-prolyl-glycineamide is prepared by coupling protected arginine with proline whose carboxyl group is protected, to produce arginyl-proline, coupling glycine amide with the resulted arginyl-proline to produce arginyl-prolyl-glycine amide and further coupling leucine with the α-nitrogen terminal of the resulting tripeptide and then removing only the protective group on the nitrogen terminal of the leucine portion, and Fragment (II)

(N- and O-protected)seryl-(O-protected)tyrosyl-glycine is prepared by coupling a lower alkyl ester of glycine to result in a corresponding seryl-tyrosyl-glycine lower alkyl ester and hydrolyzing only the ester bond of the tripeptide, thus formed.

1 Claim, 1 Drawing Figure

METHOD FOR PREPARING BIOLOGICALLY ACTIVE (PYRO) GLUTAMYL-HISTIDYL-TRYPTOPHYL-SERYL-TYROSYL-GLYCYL-LEUCYL-ARGINYL-PROLYL-GLYCINE AMIDE

BACKGROUND OF THE INVENTION

This invention relates to a method for producing a decapeptide. More specifically, it relates to a method for producing a decapeptide (hereinafter, RH) effective to promote release of the luteinizing hormone (hereinafter, LH) and the follicle-stimulating hormone (hereinafter, FSH).

With respect to the present recovery of (RH), it has been reported that RH is extracted from calves hypothalami and its ten amino acid sequence is as follows:

(Pyro)Glu-His-Trp-Ser-Tyr-Gly-Leu-Arg-Pro-Gly-NH₂, that is (pyro)glutamyl-histidyl-tryptophyl-seryl-tyrosyl-glycyl-leucyl-arginyl-prolyl-glycine amide.

However, no synthetic production method nor physical properties of the present decapeptide has been established. Generally, the synthesis of a polypeptide is, though theoretically possible, very difficult and frequently unsuccessful even if component amino acids and the sequence thereof have been defined and shown. These difficulties stem from the unexpected physical properties of oligopeptide fragments which are essential for a certain synthetic pathway planned or upon impossibilities in purification to remove by-products resulting from the planned procedure.

Therefore, it is generally considered that the stepwise elongation method to couple amino acids one by one is almost suitable for synthesis of polypeptides. The stepwise elongation method, however, is far from acceptable for commercial production of polypeptides, except for synthesis for study.

While various methods to create peptide bonds have now been established but for the commercial production of such long chained polypeptides, it is necessary to lay out a synthetic pathway consisting of some fragmentation of long sequence or proper combination of such fragmentation procedures with stepwise elongation. In practice, there is thought to exist numerous combinations of fragments for production of such long chained polypeptides. In addition to the numerous combinations, most oligopeptide fragments would belong to a novel compound group, so the physical properties are, of course, unexpected. Moreover, there would be many problems to be solved for the establishment of an ideal and commercial synthetic pathway, for example, what type of protective group is suitable for the fragments employed, or what type of coupling reactions could be used, etc.

As a result of our investigation of those problems for the commercial production of the present decapeptide, we the applicants propose a synthetic method as described below. The proposed synthetic pathway consists of an ideal combination of fragmentation, coupling reactions and protective groups suitable for the fragments.

SUMMARY OF THE INVENTION

Synthetic Pathway for Production of RH

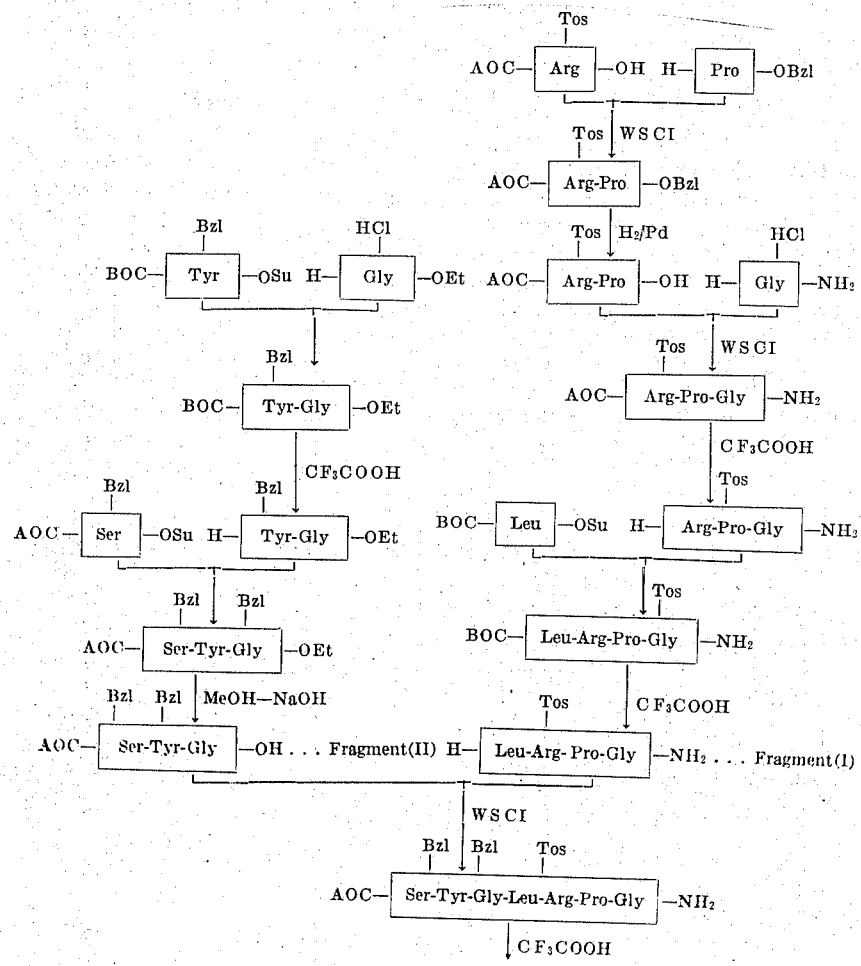

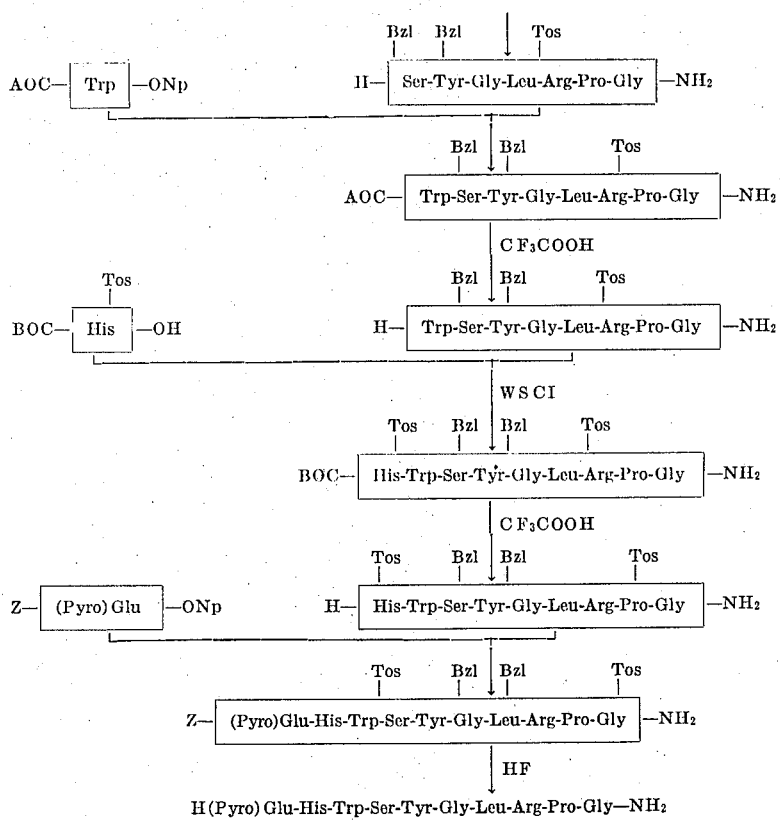

In the above schematic, the symbols used are defined below:
  Aoc: tertiary amyloxycarbonyl group
  Boc: tertiary butyloxycarbonyl group
  Tos: p-toluene sulfonyl group
  Bzl: benzyl group
  Z: benzyloxycarbonyl group
  Su: residual moiety of succinic imide
  Np: p-nitro-phenyl group
  WSCI: water soluble carbodiimides such as

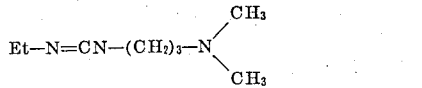

or the mineral acid salts thereof.

The initial letters of amino acids each represent a group of —NH—CH(R)—CO— in correspondence to the symbol R.

(These symbols are used according to the above definition in the present specification.)

BRIEF DESCRIPTION OF THE DRAWING

The FIGURE 1 is a UV absorption spectrum of the RH prepared in accordance with the present invention.

DETAILED DESCRIPTION OF THE INVENTION

Figure 1:
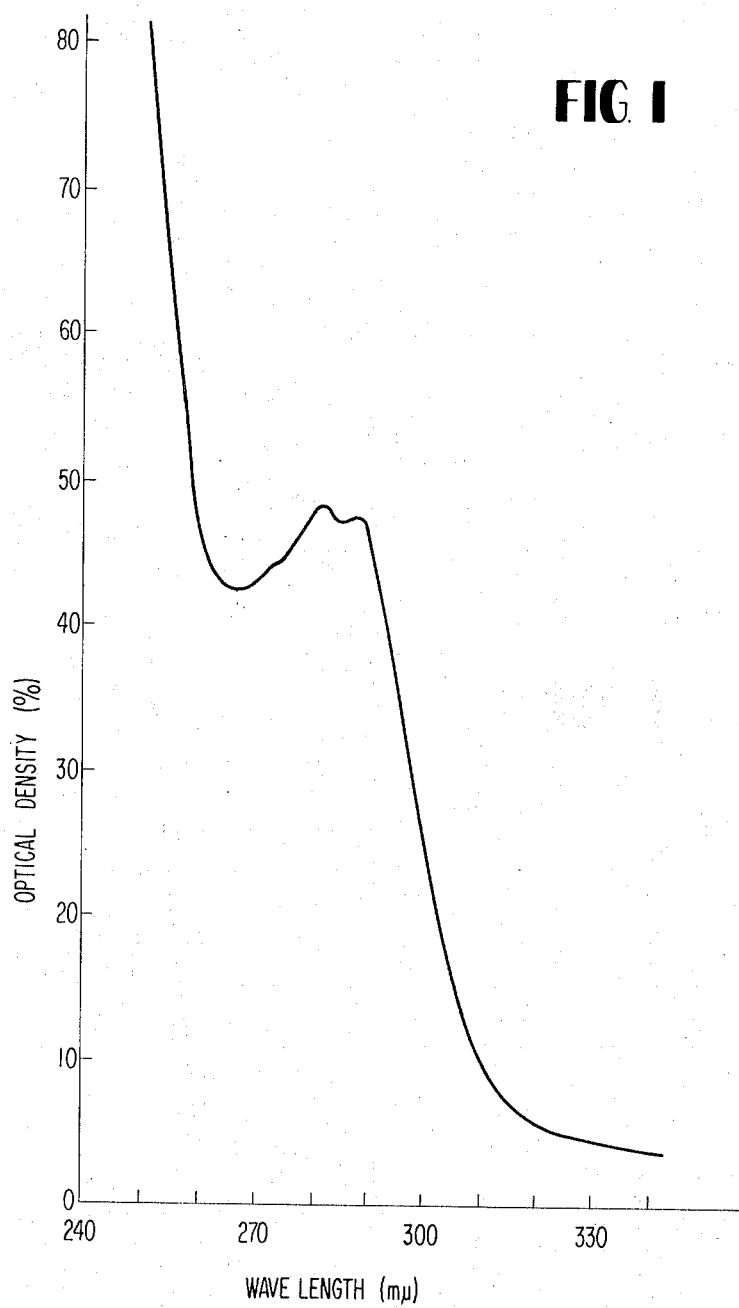

The present synthetic method for production of RH has many characteristic advantages, as hereinafter described, in comparison with any other fragmentations proposed to produce the same:

a. All of the purification processes in the present pathway do not require a great amount of characteristic solvent as required in the synthesis of general polypeptides consisting of 8 to 12 amino acids such as angiotencine I or II, bradykinin or callidin which have a similar length to RH. The purification employed in the present pathway is easily carried out through silica gel column chromatography using economically inexpensive solvents to yield an excellent amount of each intermediate product and also RH. Moreover, the present pathway contains only a few purification processes.

b. The reactions employed for the formation of the peptide couplings do not cause racemization of the material amino acids used or fragments produced, because the present fragmentation is so designed as to divide RH into two fragemnts I and II at the bond between the glycine portion and the leucin portion of RH. In addition, suitable acyloxy protective groups for the amino radical are employed so as to avoid formation of an oxazolidone ring in the coupling reactions.

c. the order of couplings in the production of the fragments, particularly fragment I, provides intermediates suitable for handling, in manufacture (for instance, its hydrophilic-lipophilic properties) owing to the combination of the order and the selected protective groups shown in the previous schematic. In addition to this, yields of by-products, such as diketopiperazine (for example, another coupling order, Pro-Gly → Arg-Pro-Gly, may cause diketopiperazine production and these intermediate fragments are too highly hydrophilic to be handled in the production of the fragments) do not occur. This proves that the present coupling order and employment of the protective groups are very advantageous to achieving the goals of this invention.

d. In the present pathway, the activated ester method and WSCI-method are so properly employed in combination with suitable protective groups so as to avoid the yield of by-products (acyl urea derivatives) taking into account the hydrophilic or easily oxidized properties of the intermediate peptide formed.

As described above, the advantages of the present synthetic method depend upon the characteristic fragmentation and the coupling order of the fragments and of the amino acids, and can not be found in any other synthetic pathway to RH, if possibly designed.

All of the intermediate peptides produced in the present invention are novel and suitable compounds which have some protective groups on the nitrogen or carbon terminal of the fragments.

With respect to the production of fragment II, the protective group on the carbon terminal of glycine in fragment II is an ester moiety which is thought to be most suitable. It is though that removal of the protective ester moiety might cause cleavages of the peptide bonds at the same time. However, a selective hydrolysis on the protective ester moiety actually proceeded successfully to yield fragment II without any side reaction.

The thus produced RH according to the present invention has been confirmed to be effective in the release of LH and FSH in accordance with biological animal tests, carried out by the present inventors.

A better understanding of the present invention will be gained from the following example, which is merely intended to be illustrative and not limitative of the present invention.

EXAMPLE (Preparation of Fragment I)

1. Synthesis of Aoc-Arg(Tos)-Pro-OBzl

In 60 ml of $CH_2Cl_2$, 23 g (52 mmole) of Aoc-Arg(Tos)—OH and 13.9 g (57 mmole) of H-Pro-OBzl.HCl were dissolved. The solution was cooled to −10°C in a refrigerant bath. Then 8.1 g (52 mmole) of water soluble carbodiimide ($n$-ethyl-N′-(dimethylaminopropyl)-carbodiimide) was added to the solution under cooling at −10 ∼−2°C. The resulting mixture was adjusted to a pH of 7 by adding 0.53 ml of N-methylmorpholine, stirred at −5°C for 30 minutes and at room temperature overnight. From the reaction mixture $CH_2Cl_2$ was distilled off to give an oily product which was dissolved in $CHCl_3$. The $CHCl_3$ solution was washed with 0.5N HCl, $H_2O$, 5% $NaHCO_3$ and $H_2O$ in turn, and then dried over anhydrous $Na_2SO_4$. $Na_2SO_4$ was removed by filtration and the filtrate was concentrated to give an oily product. The product was dissolved in 150 ml of AcOEt with heating, and then the solution was placed in a refrigerator to precipitate crystals in the form of needles. The crystals were collected by filtration, washed with AcOEt and dried in a desiccator on $P_2O_5$ under reduced pressure to give 24.0 g (73.4 percent) of the desired product. mp. 163.5–164.5°C $(\alpha)_D^{26.5}$ −33.4° (c 1.1; DMF).

Analysis calculated for $C_{31}H_{43}O_7N_5S$
C 59.13, H 6.88, N 11.12
found    C 59.09, H 6.65, N 11.02

2. Synthesis of AoC-Arg(Tos)-Pro-OH

In 200 ml of methanol, 22 g (35 mmole) of Aoc-Arg(Tos)-Pro-OBzl were dissolved. After the addition of 1.5 g of Pd-C, hydrogen gas was passed through the solution with stirring for 5 hours. Then Pd-C was removed by filtration and the methanol was distilled off. The residue obtained was dissolved in 300 ml of AcOEt, and extracted with 5 percent $NaHCO_3$. The extract was adjusted to a pH of 3 with 6N HCl under cooling and re-extracted quickly with AcOEt. After washing with water, the extract was dried over anhydrous $Na_2SO_4$. The $Na_2SO_4$ was removed by filtration and the filtrate was concentrated to dryness. To the residue, there was added a large volume of $Et_2O$ for precipitation purposes. The precipitate was dried on $P_2O_5$ under reduced pressure to give 17 g (90 percent) of the desired product. were added. After adjusting to a pH of 7 with 0.4 ml of N-methylmorpholine, the reaction solution was stirred vigorously under cooling for 30 minutes and stirred at room temperature overnight, and then the $CH_2Cl_2$ was removed by distillation. After the addition of a saturated $Na_2SO_4$ solution, the resulting liquid was extracted with a large volume of AcOEt. The AcOEt layer was washed with 0.5N HCl, $H_2O$, 5% $NaHCO_3$ and $H_2O$ in turn. In this process, the water layers were always saturated with $Na_2SO_4$. The AcOEt layer was dried over $MgSO_4$. $MgSO_4$ was removed by filtration, the filtrate was concentrated and the oily substance obtained was precipitated by the addition of ether. The precipitate was collected by filtration on a glass filter and dried in a desiccator on $P_2O_5$ under reduced pressure to give 2 g (48 percent) of the desired Aoc-Arg(Tos)-Pro-Gly-$NH_2$. The whole of this was dissolved in 7.5 ml of $CF_3COOH$ and stirred at room temperature for 1 hour. The $CF_3COOH$ was removed by distillation under reduced pressure, and the residue was dried in a desiccator on NaOH in vacuo to give an oily product (H-Arg-(Tos)-Pro-Gly-$NH_2$.$CF_3COOH$). The oily product was dissolved in 2.5 ml of DMF, adjusted to a pH of 4 by addition of 2 ml of $Et_3N$ under ice-cooling. The solution was then adjusted to a pH of 7 by another addition of 1 ml of N-methylmorpholine, to which 1.7 g (5 mmole) of Boc-Leu-OSu and 1 ml of DMF were added. After stirring at room temperature for 17 hours, 1.5 ml of N,N′-dimethylaminopropylamine were added to the solution and this was stirred at room temperature for 2 hours. The reaction mixture adding a large volume of water was extracted with $CHCl_3$. The $CHCl_3$ layer was washed with 0.5N HCl, $H_2O$, 5 percent $NaHCO_3$ and $H_2O$, then dried over $MgSO_4$, $MgSO_4$ was removed by filtration and the filtrate was concentrated to dryness. To the residue there was added EtOH and AcOEt and the mixture was heated. After allowing to stand in a refrigerator, the precipitate crystallized and the crystals were ecollected by filtration, washed with sufficient AcOEt and dried in a desiccator on $P_2O_5$ in vacuo to give 1.78 g (76.4 percent) of the desired compound. mp 150.5°–152.5°C (decomposed and became transparent at 182°C). $(\alpha)_D^{27}$ −33.0°(c 1.0; DMF).

Analysis calculated for $C_{31}H_{50}O_8N_8S.½H_2O$
C 52.89, H 7.31, N 15.92
found    C 52.79, H 7.35, N 15.67

(Preparation of Fragment II)

1. Synthesis of Boc-Tyr(Bzl)-Gly-OEt

In 5 ml of DMF there was added 500 mg of Gly-

OEt.HCl. To this 0.5 ml of Et₃N was added with stirring under cooling. To the mixture there was added 1.45 g of Boc-Tyr(Bzl)-OSu. The mixture was stirred at room temperature for one day and diluted with CHCl₃. After addition of 0.5 ml of dimethylaminopropylamine, the resulting mixture was stirred for 30 minutes. The reaction mixture was washed with N-HCl, H₂O,N Na₂CO₃ and H₂O, then the CHCl₃ layer was dried over MgSO₄ and CHCl₃ was removed by distillation to yield crystals which were recrystallized from ethyl acetate-hexane to give 1.21 g (85.8 percent) of the desired compound. mp 131.5°–132.5°C.

2. Synthesis of Aoc-Ser (Bzl)=Tyr(Bzl)-Gly-OEt 5 ml of $CF_3COOH$ were added to 3.76 g of Boc-Tyr(Bzl)-Gly-OEt with stirring under cooling. After 10 minutes this mixture was warmed up to room temperature and stirred for 40 minutes. $CF_3COOH$ was distilled off in vacuo and the oily substance obtained was dried in a desiccator on NaOH. The substance was dissolved in 4 ml of DMF and the solution was adjusted to a pH of 7–8 by adding 2.64 ml of Et₃N with stirring under cooling. To this, 3.70 g of Aoc-Ser(Bzl)-OS₄ were added and stirred at room temperature for 2 days. Then the reaction mixture was diluted with CHCl₃, and washed with N HCl, H₂O, N Na₂CO₃ and H₂O. The CHCl₃ layer was dried over MgSO₄ and CHCl₃ was removed by distillation to give crystals which were recrystallized from ethyl acetate-hexane to give 4.54 g (84.1 percent) of the desired compound. mp 71.5°–74.5°C.

Analysis calculated for $C_{36}H_{45}O_8N_3$
C 66.74, H 7.00, N 6.48
found    C 66.95, H 7.20, N 6.42

2'. Synthesis of Aoc-Ser(Bzl)-Tyr(Bzl)-Gly-OH

In 5 ml of MeOH, 2.02 g of Aoc-Ser(Bzl)-Tyr(Bzl)-Gly-OEt were dissolved. To the solution 3 ml of N NaOH were added dropwise with stirring and then it was rendered to react for 4 hours. After adjusting to a pH of 7 with N HCl, MeOH was removed. Then the solution was adjusted to a pH of 3 with another N HCl to precipitate crystals which were extracted with AcOEt. The AcOEt layer was washed with H₂O and dried over MgSO₄. The AcOEt was removed by distillation to give crystals which were recrystallized from ethyl acetate-hexane to give 3.54 g (80.4 percent) of the desired compound. mp 94.5°–98.0°C $(\alpha)_D$–16.1° (c 1.5; DMF).

Analysis calculated for $C_{34}H_{41}O_9N_3$
C 65.89, H 6.67, N 6.78
found    C 66.20, H 6.76, N 6.68

Amino acid analysis (6N HCl, 105°C, 24 hours) Ser 0.95, Tyr 0.89, Gly 1.00.

(CONDENSATION OF FRAGMENTS I AND II)

Synthesis of Aoc-Ser(Bzl)-Tyr(Bzl)-Gly-Leu-Arg(Tos)-Pro-Gly-NH₂

To 694 mg of Boc-Leu-Arg(Tos)-Pro-Gly-NH₂, there was added 3 ml of $CF_3COOH$ with stirring under cooling. After stirring at room temperature for 40 minutes, $CF_3COOH$ was removed by distillation in vacuo. To the oily substance there was added ether to crystallize out the occurring white precipitate which was dried in a desiccator on NaOH. The precipitate was dissolved in a mixture of 20 ml of THF * and 3 ml of $CH_3CN$ and to the resulting solution there was added 0.17 ml of N-ethyl-N'(dimethylaminopropyl) carbodiimide with stirring under cooling at –15~–20°C. This procedure was carried out at a pH of 7–8. To the mixture there was added 711 ml of Aoc-Ser(Bzl)-Gly-OH and the resulting mixture was stirred at room temperature for 30 minutes and allowed to stand overnight. Then the solvent was removed by distillation and the residue was dissolved in CHCl₃. The CHCl₃ layer was washed with N HCl, H₂O, 5 % NaHCO₃ and H₂O and then dried over MgSO₄. Then the CHCl₃ was distilled off to yield a powder of gel form. This was subjected to SiO₂ column chromatography and eluted with a mixed solution of CHCl₃(95):MeOH(5):AcOH(3). The obtained powder gave a single spot on TLC. The powder was reprecipitated from chloroform-ether to give 960 mg (78.7 percent) of the desired product. mp 118.5°–123.0°C $(\alpha)_D$–29.1° (c 1; DMF).

Analysis calculated for $C_{60}H_{82}O_{13}N_{11}S.H_2O$
C 59.29, H 6.97, N 12.67
found    C 59.35, H 6.97, N 12.20

Synthesis of Aoc-Trp-I-II

To 856 mg of Aoc-Ser(Bzl)-Tyr(Bzl)-Gly-Leu-Arg(Tos)-Pro-Gly-NH₂, 5 ml of $CF_3COOH$ were added with stirring under cooling. After 10 minutes, the mixture was warmed up to room temperature and stirred for 40 minutes. Excess $CF_3COOH$ was removed by distillation and to the oily residue obtained, ether was added to crystallize out the occurring white precipitate. This was dried in a desiccator on NaOH and dissolved in 2 ml of DMF and the solution was adjusted to a pH of 8 by adding 0.2 ml of N-methyl-morpholine with stirring under cooling. After addition of 400 mg of Aoc-Trp-ONp, the solution was stirred at room temperature for 2 days and diluted with CHCl₃. To the mixture, 0.5 ml of dimethylaminopropylamine were added and stirred for 45 minutes. The CHCl₃ layer was washed with N-HCl, H₂O, N-Na₂CO₃ and H₂O, and dried over MgSO₄. The CHCl₃ was removed through distillation to yield a gel substance which was subjected to SiO₂ column chromatography and eluted with a mixed solvent of CHCl₃(5):AcOEt(5): EtOH(2) to yield the desired product which gave a single spot on TLC. This was recrystallized from chloroform-ether to give 777 mg (78.7 percent) of the compound. mp 143.0°–148.0°C $(\alpha)_D$–34.5° (c 1; DMF).

Analysis calculated for $C_{71}H_{92}O_{14}N_{13}S.H_2O$
C 60.83, H 6.76, N 12.99
found    C 60.96, H 6.66, N 13.10

Synthesis of Boc-His(Tos)-Trp-I-II

To 549 mg of Aoc-Trp-Ser(Bzl)-Tyr(Bzl)-Gly-Leu-Arg(Tos)-Pro-Gly-NH₂, 0.05 ml of mercaptoethanol (HSCH₂CH₂OH) and 5 ml of $CF_3COOH$ were added. After 10 minutes, it was warmed up to room temperature and stirred for 40 minutes. Excess $CF_3COOH$ was removed by distillation and ether was added to the oily residue to give a white precipitate. The precipitate was dried in a desiccator on NaOH and dissolved in a mixture of 2 ml of DMF and 3 ml of $CH_3CN$. To the solution there was added 0.08 ml of N-ethyl-N'-(dimethylaminopropyl)carbodiimide with stirring under cooling ($-15°\sim-20°C$) then 226 mg of Boc-His(Tos)-OH were added. The mixture was stirred at the same temperature for 1 hour, then warmed up to room temperature and allowed to stand overnight. The $CH_3CN$ was removed through distillation in vacuo. $CHCl_3$ was added and the $CHCl_3$ layer was washed with N-HCl, $H_2O$, 5 percent $NaHCO_3$ and $H_2O$ and then dried over $MgSO_4$. When $CHCl_3$ was removed by distillation a gel substance was obtained, which was subjected to $SiO_2$ column chromatography eluting with a mixture of $CHCl_3(5):AcOEt(5): EtOH(2)$. The substance obtained showed a single spot on a TLC, which was re-precipitated from chloroform-ether to give 390 mg (59.3 percent) of the desired compound. mp 154.0°–157.5°C $(\alpha)_D$–36.8° (c 0.4; DMF).

Analysis calculated for $C_{83}H_{103}O_{17}N_{16}S_2 \cdot H_2O$
C 58.74, H 6.35, N 13.20
found    C 58.40, H 6.11, N 13.00

Synthesis of Z(Pyro)Glu-His(Tos)-Trp-I-II

To 252 mg of Boc-His(Tos)-Trp-Ser(Bzl)-Tyr(Bzl)-Gly-Leu-Arg(Tos)-Pro-Gly-$NH_2$, 0.05 ml of mercatoethanol, 10 mg of tryptophane and 3 ml of $CF_3COOH$ were added with stirring under cooling. After 10 minutes, the resulting mixture was warmed up to room temperature and stirred for 40 minutes. Then an excess of $CF_3COOH$ was removed by distillation. To the oily substance obtained, ether was added to crystallize out a white precipitate which was dried in a desiccator on NaOH and dissolved in 1 ml of DMF. The solution was adjusted to a pH of 7–8 by adding 0.15 ml of N-methylmorpholine with stirring under cooling. To this 86 mg of Z-(Pyro)Glu-ONp was added and the mixture was warmed up to room temperature, and then stirred for 2 days. After addition of $CHCl_3$, the reaction mixture was washed with N—HCl, $H_2O$, N—$Na_2CO_3$ and $H_2O$. The $CHCl_3$ layer was dried over $MgSO_4$ and the $CHCl_3$ was removed by distillation to give a substance in the form of a gel. The gel was subjected to $SiO_2$ column chromatography, eluting with a mixed solvent of $CHCl_3(95):MeOH(5):AcOH(3)$ to yield a compound which showed a single spot on TLC. This was re-precipitated from chloroform-ether to give 150 mg (54.6 percent) of the desired compound with a melting point of 133.5°–138.5°C (decomposed).

SYNTHESIS OF RH

In the HF-reaction vessel, 100 mg of Z-(pyro)Glu-His(Tos)-Trp-Ser(Bzl)-Tyr(Bzl)-Gly-Leu-Arg(Tos)-Pro-Gly-$NH_2$ were introduced. Then 51 mg of tryptophane, 21.6 mg of skatol, 0.6 ml of anisol, and 5 ml of HF were added. The mixture was rendered to react at 0°C for 1 hour and the HF was removed through distillation at 0°C. The residue was dried in a desiccator on NaOH and then it was dissolved in cold water which was washed with ether. The water layer was passed through a column of an ion-exchange resin (Dowex 1X2($AcO^-$); trade name) which was eluted with $H_2O$. The water solution was freeze-dried to yield a powder which was treated with a chromatography of Sephadex G-15 (trade name) eluting 0.2 N AcOH. The main fractions were collected and freeze-dried to yield 25 mg of powder. When the powder was subjected to electrophoresis, a single spot was obtained, whose ninhydrin reaction was negative and Pauri reaction was positive. $(\alpha)_D$–46.2° (c 0.3; $H_2O$).

Analysis calculated for $C_{55}H_{75}O_{13}N_{17} \cdot 3(CH_3COOH) \cdot 4H_2O$
C 51.07, H 6.68, N 16.60
found    C 51.00, H 6.59, N 16.48

Amino acid analysis (6N HCl, 105°C; 24 hours). Glu 1.11, His 0.90, Trp 0.94, Ser 0.97, Tyr 0.96, Gly 2.02, Leu 1.00, Arg 1.02, Pro 1.05. NOTE: The value of Trp was calculated from the absorbance of UV spectrum shown in FIG. 1.

Although the present invention has been adequately described in the foregoing specification and examples included therein, it is readily apparent that various changes and modifications can be made without departing from the spirit and scope thereof.

What is claimed is:

1. A method for preparing biologically active (pyro)-glutamyl-histidyl-tryptophyl-seryl-tyrosyl-glycyl-leucyl-arginyl-prolyl-glycine amide which comprises reacting an oligopeptide fragment identified as (I) with an oligopeptide fragment identified as (II), each of which are prepared according to the synthesis described below, to form the heptapeptide, seryl-tryrosyl-glycyl-leucyl-arginyl-prolyl-glycine amide having some corresponding protective groups thereon, and coupling the resulting heptapeptide with protected tryptophane, histidine and (pyro)glutamic acid in turn at the nitrogen terminal of the each resulting peptide by stepwise elongation to result in a protected decapeptide, and then removing all the protective groups by treating the protected decapeptide with hydrogen fluoride:

Fragment (I):

Leucyl-(N-protected)arginyl-prolyl-glycineamide is prepared by coupling protected arginine with proline whose carboxyl group is protected, to produce arginylproline, coupling glycine amide with the resulted arginyl-proline to produce arginyl-prolyl-glycine amide and further coupling leucine with the α-nitrogen terminal of the resulting tripeptide and then removing only the protective group on the nitrogen terminal of the leucine portion, and Fragment (II):

(N- and O-protected)seryl-(O-protected)tyrosyl-glycine is prepared by coupling a lower alkyl ester of glycine to result in a corresponding seryl-tyrosyl-glycine lower alkyl ester and hydrolyzing only the ester bond of the tripeptide, thus formed.

* * * * *